US012687404B2

(12) United States Patent
Nagata et al.

(10) Patent No.: US 12,687,404 B2
(45) Date of Patent: Jul. 21, 2026

(54) INFORMATION PROCESSING DEVICE

(71) Applicant: TOYOTA JIDOSHA KABUSHIKI KAISHA, Toyota (JP)

(72) Inventors: Yu Nagata, Chofu (JP); Takehira Ota, Inazawa (JP); Daisuke Tanizaki, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/810,681

(22) Filed: Aug. 21, 2024

(65) Prior Publication Data

US 2025/0216215 A1     Jul. 3, 2025

(30) Foreign Application Priority Data

Dec. 28, 2023     (JP) .................................. 2023-223524

(51) Int. Cl.
G01C 21/36          (2006.01)

(52) U.S. Cl.
CPC ..... G01C 21/3682 (2013.01); G01C 21/3697 (2013.01)

(58) Field of Classification Search
CPC ........................ G01C 21/3682; G01C 21/3697
See application file for complete search history.

(56) References Cited

U.S. PATENT DOCUMENTS

2017/0108348 A1 * 4/2017 Hansen .................. H04W 4/024
2019/0086223 A1 * 3/2019 Tanaka .................... G06F 16/00

FOREIGN PATENT DOCUMENTS

| CN | 107733954 | A | * | 2/2018 | ............ | H04W 4/025 |
| CN | 116662680 | A | * | 8/2023 | ......... | G06F 16/9537 |
| JP | 2005-321320 | A | | 11/2005 | | |
| JP | 2023-061659 | A | | 5/2013 | | |
| JP | 2015-075354 | A | | 4/2015 | | |
| JP | 2018146451 | A | * | 9/2018 | | |
| JP | 7360332 | B2 | * | 10/2023 | | |
| WO | WO-2019130752 | A1 | * | 7/2019 | ............ | G06Q 30/02 |

OTHER PUBLICATIONS https://web.archive.org/web/20201031171929/https://locators.bankofamerica.com/ (Year: 2020).*

* cited by examiner

*Primary Examiner* — Hunter B Lonsberry
*Assistant Examiner* — Besufekad Lemma Tessema
(74) *Attorney, Agent, or Firm* — SoraIP, Inc.

(57) ABSTRACT

A control unit of the information processing device acquires a category to which a destination facility, namely a destination of a user, belongs. Further, the control unit of the information processing device acquires attributes of one or a plurality of facilities belonging to a category related to a category to which the destination facility belongs. The control unit of the information processing device determines one or a plurality of proposed facilities for proposing a visit to the user from one or a plurality of facilities according to attributes of the one or a plurality of facilities. Then, the control unit of the information processing device outputs proposal information for proposing a visit to the determined one or more proposed facilities to the user terminal.

10 Claims, 5 Drawing Sheets

CORRESPONDING INFORMATION

| DESTINATION CATEGORY | CORRESPONDING CATEGORY | PRIORITY ATTRIBUTE | RANK |
|---|---|---|---|
| *** | *** | *** | *** |
| | ⋮ | ⋮ | ⋮ |
| | *** | *** | *** |
| ⋮ | ⋮ | ⋮ | ⋮ |
| CAMPGROUND | SUPERMARKET | LOCATION | 1 |
| | HOME IMPROVEMENT STORE | SIZE | 2 |
| ⋮ | ⋮ | ⋮ | ⋮ |

FIG. 3

FACILITY INFORMATION

| FACILITY ID | NAME | CATEGORY | LOCATION | SIZE | POPULARITY | PRICE | CONGESTION DEGREE |
|---|---|---|---|---|---|---|---|
| *** | *** | *** | *** | *** | *** | *** | *** |
| ... | ... | ... | ... | ... | ... | ... | ... |

FIG. 4

CORRESPONDING INFORMATION

| DESTINATION CATEGORY | CORRESPONDING CATEGORY | PRIORITY ATTRIBUTE | RANK |
|---|---|---|---|
| *** | *** | *** | *** |
| | ⋮ | ⋮ | ⋮ |
| | *** | *** | *** |
| ⋮ | ⋮ | ⋮ | ⋮ |
| CAMPGROUND | SUPERMARKET | LOCATION | 1 |
| | HOME IMPROVEMENT STORE | SIZE | 2 |
| ⋮ | ⋮ | ⋮ | ⋮ |

START

ACQUIRE PLANNED TRAVEL ROUTE — S101

ACQUIRE DESTINATION CATEGORY — S102

ACQUIRE CORRESPONDING CATEGORY — S103

SEARCH FOR CANDIDATE FACILITIES — S104

DETERMINE PRIORITY ATTRIBUTES — S105

ACQUIRE ATTRIBUTES OF CANDIDATE FACILITIES — S106

DETERMINE PROPOSED FACILITIES AND PRIORITIES — S107

OUTPUT PROPOSAL INFORMATION — S108

END

INFORMATION PROCESSING DEVICE

CROSS-REFERENCE TO RELATED APPLICATION

This application claims priority to Japanese Patent Application No. 2023-223524 filed on Dec. 28, 2023 incorporated herein by reference in its entirety.

BACKGROUND

1. Technical Field

The present disclosure relates to information processing devices.

2. Description of Related Art

Japanese Unexamined Patent Application Publication No. 2015-75354 (JP 2015-75354 A) discloses an information system including a navigation device and a server device. The navigation device of this information system acquires route-related information including navigation location information indicating a current location and destination information indicating a destination. The route-related information is information on a route from the current location indicated by the navigation location information to the destination indicated by the destination information. The navigation device sends the route-related information to the server device. After the navigation device sends the route-related information to the server device, the navigation device receives one or more pieces of point-related information from the server device. The one or more pieces of point-related information are information on one or more points around the route from the current location indicated by the navigation location information to the destination indicated by the destination information. The navigation device outputs the one or more pieces of point-related information.

The server device of this information system stores one or more pieces of point-related information associated with location information indicating the locations of points on a map. The one or more pieces of point-related information are information on the points on the map. The server device receives the route-related information from the navigation device. The server device acquires one or more pieces of point-related information on one or more points around the route determined by the received route-related information. The server device then sends the one or more pieces of point-related information acquired by a server point-related information acquisition unit to the navigation device.

SUMMARY

An object of the present disclosure is to propose a visit to a facility suitable for a user.

An information processing device according to the present disclosure includes a control unit.

The control unit is configured to
acquire a category to which a destination facility belongs, the destination facility being a destination of a user,
acquire an attribute of one or more facilities that belong to a category related to the category to which the destination facility belongs,
determine, from the one or more facilities, one or more proposed facilities to be proposed to the user to visit, according to the attribute of the one or more facilities, and output, to a user terminal, proposal information proposing to the user a visit to the determined one or more proposed facilities.

The present disclosure can propose a visit to a facility suitable for a user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram illustrating an example of a table configuration of facility information held in a facility information database;

FIG. 4 is a diagram illustrating a table configuration of correspondence information held in a correspondence information database.

DETAILED DESCRIPTION OF EMBODIMENTS

It is herein assumed that when a user moves to a destination facility, namely his/her destination, a visit to a facility other than the destination is proposed to the user. It is assumed that a facility other than the destination is a facility belonging to a category related to a category to which the destination facility belongs. A facility of a category related to the category to which the destination facility belongs is a category facility that is expected to be capable of meeting the demand that arises in visiting a category facility to which the destination facility belongs. At this time, it is assumed that the attribute of the facility, which is suitable for the visit of the user, is different depending on the category to which the facility belongs. Here, the attribute is, for example, a location, a size, a popularity level, a price, a congestion level, or the like of the facility.

The control unit of the information processing device according to the present disclosure acquires a category to which a destination facility, namely a destination of the user, belongs. Further, the control unit of the information processing device according to the present disclosure acquires attributes of one or a plurality of facilities belonging to a category related to the category to which the destination facility belongs. The control unit determines, from the one or more facilities, one or more proposed facilities that propose a visit to the user according to the attribute of the one or more facilities. Then, the control unit outputs proposal information for proposing a visit to the determined one or more proposed facilities to the user terminal.

As described above, the information processing device determines, as the proposed facility, a facility suitable for the visit of the user among the one or more facilities belonging to the category related to the category to which the destination facility, namely the destination of the user, belongs, according to the attribute of the one or more facilities. This makes it possible to propose a visit to a facility suitable for the user.

Hereinafter, embodiments of the present disclosure will be described with reference to the drawings. A hardware configuration, a module configuration, a functional configuration, etc., described in each embodiment are not intended to limit the technical scope of the disclosure to them only unless otherwise stated.

EMBODIMENT

System Overview

Figure 1:
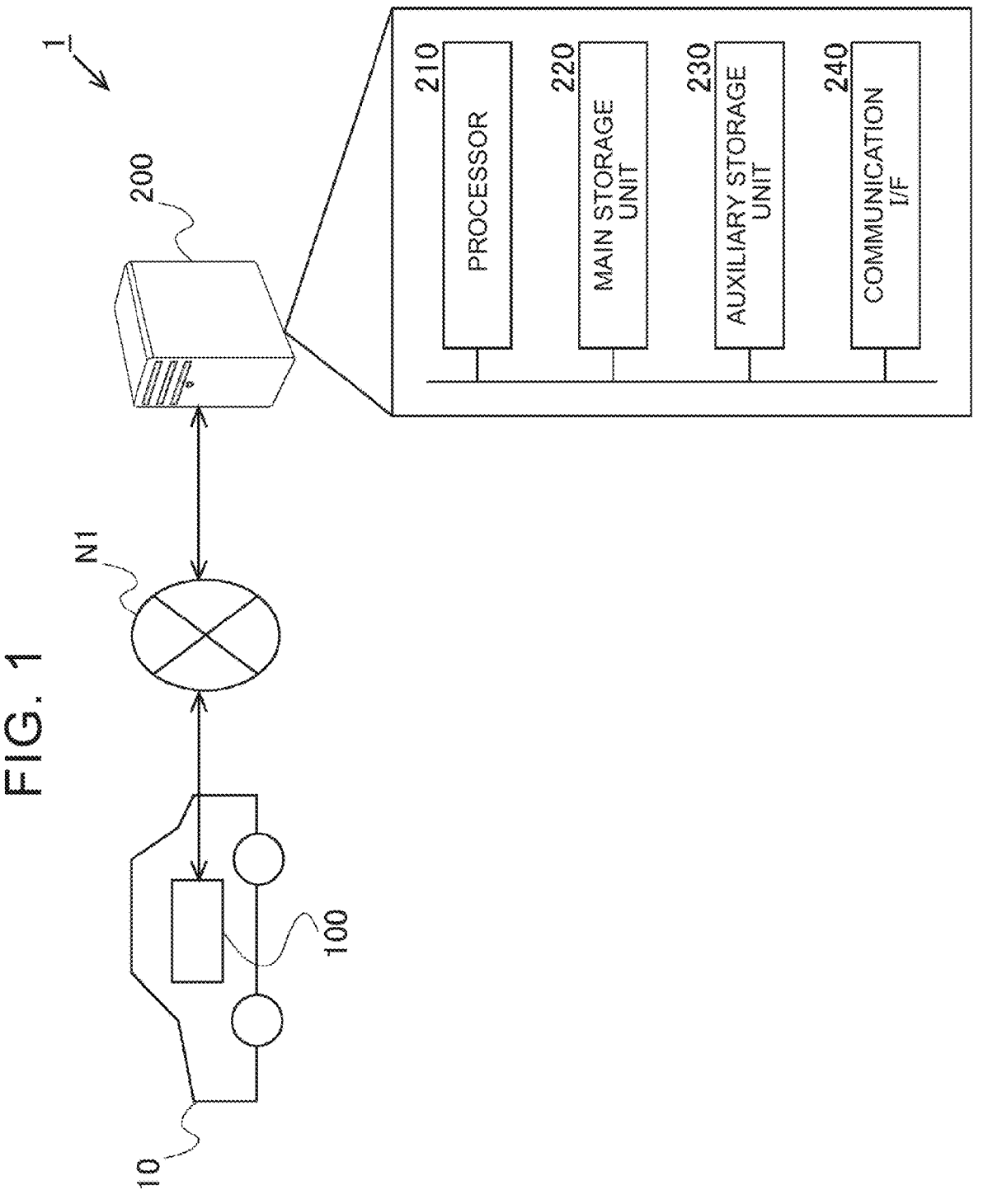
FIG. 1 is a diagram illustrating a schematic configuration of a proposed system.

The proposal system 1 according to the present embodiment will be described with reference to FIG. 1. FIG. 1 is a diagram illustrating a schematic configuration of a proposal system 1. The proposal system 1 includes a user terminal 100 and a server 200. In the proposal system 1, the user terminal 100 and the server 200 are connected to each other by a network N1. The network N1 may be, for example, a worldwide public communication network such as Internet or the like, and a wide area network (WAN) or a telecommunications network such as a cellular network.

User Terminal

The user terminal 100 is a device mounted on the vehicle 10. The user terminal 100 outputs various types of information to the user of the vehicle 10 (display on a display, audio output, and the like). The user terminal 100 is, for example, a car navigation system. A user of the vehicle 10 inputs a destination to the user terminal 100. The user terminal 100 transmits destination information indicating the present position (departure point) and the destination of the vehicle 10 to the server 200 via the network N1.

The user terminal 100 receives the route data from the server 200 via the network N1. The route information is information including a scheduled traveling route of the vehicle 10. Upon receiving the route information, the user terminal 100 outputs the route information to the user of the vehicle 10. In addition, the user terminal 100 receives the suggestion data via the network N1. Upon receiving the proposal information, the user terminal 100 outputs the proposal information to the user of the vehicle 10 in accordance with the received information. Here, the proposal information is information about a facility that proposes a visit to the user of the vehicle 10.

Server

The server 200 is a server device that manages the travel of the vehicle. The server 200 receives the destination information from the user terminal 100 via the network N1. The server 200 generates a scheduled traveling route of the vehicle 10 in accordance with the destination information. Then, the server 200 transmits route information including the generated travel scheduled route to the user terminal 100.

Further, the server 200 proposes a visit to a facility other than the destination of the user of the vehicle 10 to the user of the vehicle 10. Facilities other than a destination facility, namely a destination of the vehicle 10, are facilities of a category related to the category to which the destination facility belongs. A facility of a category related to the category to which the destination facility belongs is a category facility that is expected to be capable of meeting the demand that arises in visiting a category facility to which the destination facility belongs.

For example, it is assumed that the category to which the destination facility of the vehicle 10 belongs is a camp place. In this case, it is assumed that the user of the vehicle 10 consumes food or the like in the camp place. Therefore, when the user of the vehicle 10 visits the camp site, it can be assumed that the user visits the supermarket in order to satisfy the demand for food. In addition, it is assumed that the user of the vehicle 10 runs short of camping goods in the camping area. Therefore, when the user of the vehicle 10 visits the camp site, it can be assumed that the user visits the home improvement store in order to satisfy the demand of the camping tool.

Further, it is assumed that a user of the vehicle 10 visits a supermarket when visiting a camp site. At this time, the larger the distance from the camp site, the longer the time for transporting the food. Therefore, the larger the distance from the camp site, the more easily the food is damaged. Therefore, when a supermarket is proposed to a user of the vehicle 10, the closer the supermarket is proposed from the camp place, the fresher the user of the vehicle 10 can consume the food in the camp place. That is, the more the supermarket close to the camp site is proposed, the more the demand of the user of the vehicle 10 can be met.

Further, it is assumed that the user of the vehicle 10 visits the home improvement store when visiting the camp site. In this case, it is assumed that the larger the size of the home improvement store is, the better the product selection is. On the other hand, in the home improvement store, even if the distance from the camp site is large, it is assumed that the influence on camping goods is small. Therefore, in a case where the home improvement store is proposed to the user of the vehicle 10, even if the home improvement store is far from the camp site, the larger the size of the home improvement store is proposed, the more the user of the vehicle 10 can meet the demand.

As described above, when the destination of the user of the vehicle 10 is a camp place, the attribute suitable for the visit of the user is the location of the facility (supermarket) and the size of the facility (home improvement store). In addition, the category to which the destination facility, namely the destination of the user of the vehicle 10, belongs is not necessarily limited to the camp field. The destination facility that is the destination of the user of the vehicle 10 may be, for example, a landmark or the like.

In this case, when the user of the vehicle 10 visits the landmark, it is assumed that the vehicle 10 is parked in the parking lot. In addition, when the user of the vehicle 10 visits the landmark, it is assumed that the user stays at a nearby hotel. Therefore, for example, a parking lot and a hotel are assumed as categories related to landmarks. In this case, it is assumed that the lower the price of the parking lot, the more the demand of the user of the vehicle 10 can be met. Further, it is assumed that the higher the popularity of the hotel, the more the demand of the user of the vehicle 10 can be met.

As such, attributes suitable for a user's visit may include, in addition to the location of the facility and the size of the facility, the price of the service provided at the facility (parking lot) and the popularity of the facility (hotel). In addition, a facility that can satisfy the demand of the user can be envisaged as the product provided in the facility is cheaper. Thus, an attribute suitable for a user's visit may include a price of a commodity provided in the facility. In addition, a facility that can satisfy the demand of the user as much as the facility is not congested can also be assumed. Thus, an attribute suitable for the visit of the user may include the congestion level of the facility.

As described above, it is assumed that the attribute of the facility that is suitable for the visit of the user (hereinafter, may be simply referred to as "attribute of the facility") differs depending on the category of the facility proposed to the user of the vehicle 10. Therefore, the server 200 determines one or more facilities that, depending on the attributes of each facility, belong to a category related to the category to which the destination facility, namely the destination of the user of the vehicle 10, belongs, and propose one or more facilities to the user of the vehicle 10 (hereinafter referred to as the "Proposed Facility"). Then, the server 200 outputs (transmits) proposal information for proposing to the user of the vehicle 10 to visit one or a plurality of proposed facilities via the network N1 to the user terminal 100. Details of a method by which the server 200 determines one or more proposed facilities will be described later.

The server 200 includes a computer having a processor 210, a main storage unit 220, an auxiliary storage unit 230, and a communication interface (communication I/F) 240. The processor 210 is, for example, a central processing unit (CPU) or a digital signal processor (DSP). The main storage unit 220 is, for example, a random access memory (RAM). The auxiliary storage unit 230 is, for example, a read only memory (ROM). The auxiliary storage unit 230 is, for example, a hard disk drive (HDD) or a disc recording medium such as a CD-ROM, a DVD disc, or a Blu-ray disc. The auxiliary storage unit 230 may be a removable medium (a portable storage medium). Examples of the removable medium include a USB memory or an SD card. The communication I/F 240 is, for example, a local area network (LAN) interface board or wireless communication circuitry for wireless communication.

In the server 200, an operating system (OS), various programs, various information tables, and the like are stored in the auxiliary storage unit 230. Further, in the server 200, the processor 210 loads the program stored in the auxiliary storage unit 230 into the main storage unit 220 and executes the program, thereby realizing various functions as described later. However, some or all of the functions of the server 200 may be implemented by hardware circuitry such as ASIC or FPGA. Note that the server 200 does not necessarily have to be realized by a single physical configuration, and may be constituted by a plurality of computers that cooperate with each other. Similarly to the server 200, the user terminal 100 includes a computer.

Functional Configuration

Figure 2:
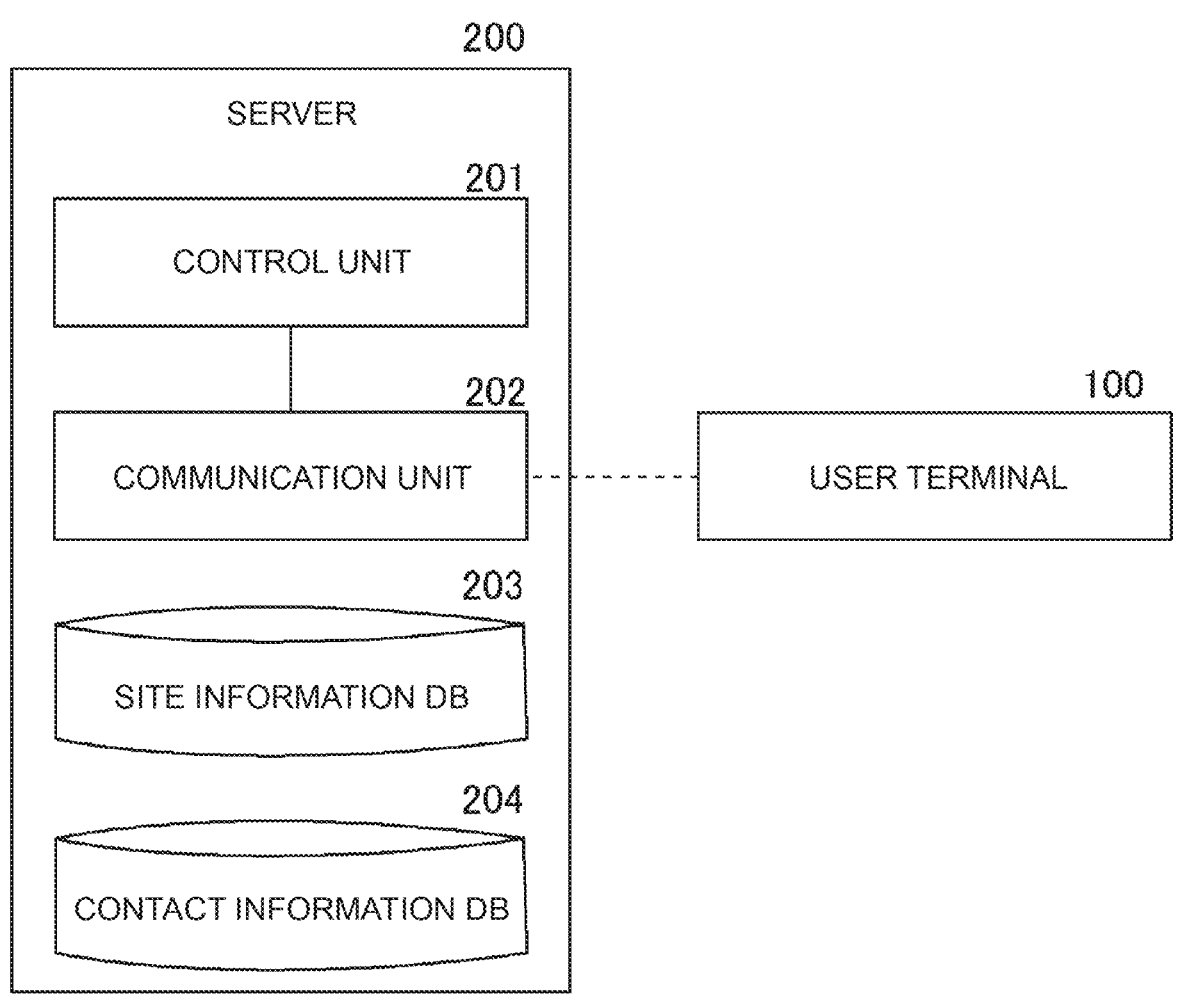
FIG. 2 is a block diagram schematically illustrating an example of a functional configuration of a server according to the present embodiment.

Next, a functional configuration of the server 200 constituting the proposal system 1 according to the present embodiment will be described with reference to FIG. 2 to FIG. 4. FIG. 2 is a block diagram schematically illustrating an example of a functional configuration of the server 200 according to the present embodiment.

The server 200 is configured to include a control unit 201, a communication unit 202, a facility information database 203 (facility information DB 203), and a correspondence information database 204 (correspondence information DB 204). The control unit 201 has a function of performing arithmetic processing for controlling the server 200. The control unit 201 is implemented by the processor 210 in the server 200. The communication unit 202 has a function of connecting the server 200 to a network N1. The communication unit 202 can be realized by a communication I/F 240 in the server 200.

The facility information DB 203 has a function of holding facility information. The facility information is information related to a plurality of facilities. The facility information includes information on the category of each facility and the attributes of each facility. The facility information DB 203 can be realized by the auxiliary storage unit 230 in the server 200. FIG. 3 is a diagram illustrating an exemplary table configuration of facility information held in the facility information DB 203.

As shown in FIG. 3, the facility data includes the facility ID field, name field, category field, location field, size field, popularity field, pricing field, and congestion field. In the facility ID field, an identifier (facility ID) for identifying the respective facilities is stored. In the name field, information indicating the name of the facility of the corresponding facility ID is stored. In the category ID field, information indicating a category to which the facility of the corresponding facility ID belongs is stored.

In the location field, information indicating the location of the facility of the corresponding facility ID is stored. In the size field, information indicating the size of the facility of the corresponding facility ID is stored. The information indicating the size of the facility is, for example, information indicating the size of the facility classified into classes such as large size, medium size, and small size.

In the popularity field, information indicating the popularity of the facility of the corresponding facility ID is stored. The information indicating the popularity of the facility is determined according to, for example, a questionnaire result of a plurality of users using the facility. In the price field, information indicating the price of the commodity or service provided in the facility of the corresponding facility ID is stored. The price of the goods or services offered at the facility may be the price of the particular goods or services offered at the facility.

The price of a particular commodity or service is the price of the commodity or service predetermined for each category. Specified goods or services are designated by the facilities belonging to the category of goods or services that are generally purchased. The particular commodity is, for example, the price of the gasoline if the category is a gas station. In addition, when the category is a supermarket, the specific product is, for example, a price of a generally purchased product such as bread. The specific service is, for example, a parking fee per hour of the parking lot when the category is a parking lot. Further, the price of the commodity or service provided at the facility may be an average price, a price range, or the like of the commodity or service provided at the facility.

In the congestion degree field, information indicating the congestion degree in the facility of the corresponding facility ID is stored. The information indicating the congestion degree in the facility includes information indicating the congestion degree for each time zone. Further, the information indicating the congestion degree in the facility includes information indicating the congestion degree for each day of the week.

By acquiring the facility information held in the facility information DB 203, the control unit 201 can grasp the category of the facility and the attributes (location, size, popularity, price, and congestion degree) of the facility.

The control unit 201 receives destination information from the user terminal 100 by the communication unit 202. The control unit 201 refers to the current position of the vehicle 10 and the destination included in the destination information, and generates a travel scheduled route of the vehicle 10. Then, the control unit 201 transmits route information including the scheduled traveling route to the user terminal 100 via the communication unit 202.

The control unit 201 refers to the facility information and acquires a category (hereinafter, may be referred to as a "destination category") to which the destination facility of the vehicle 10, which is the end point of the scheduled traveling route of the vehicle 10, belongs. Then, the control unit 201 refers to the correspondence information held in the correspondence information DB 204, and acquires a category corresponding to the destination category (hereinafter, sometimes referred to as "correspondence category"). Here, the corresponding category is a category related to the destination category (a category expected to be capable of meeting a demand generated in visiting a facility of the destination category). That is, in the present embodiment, when the destination category is a camp place, the corresponding category is a supermarket and a home improvement store.

The correspondence information is information indicating correspondence between the destination category and the correspondence category. The correspondence information DB 204 has a function of holding correspondence information. FIG. 4 is a diagram illustrating a table configuration of correspondence information held in the correspondence information DB 204. As illustrated in FIG. 4, the correspondence information includes a destination category field, a correspondence category field, a priority attribute field, and a rank field.

In the destination category field, information indicating the category of each facility is stored. In addition, a category (corresponding category) corresponding to the category of the corresponding destination category is stored in the corresponding category field. In the attribute field, information indicating an attribute of a facility belonging to a corresponding category and suitable for a user's visit (hereinafter, sometimes referred to as a "priority attribute") is stored. In the example illustrated in FIG. 4, when the correspondence category is a supermarket, "position" is stored as the priority attribute in the attribute field. When the corresponding category is a home improvement store, "size" is stored as the priority attribute in the attribute field.

In the order field, information indicating a priority set for each corresponding category and indicating a priority when proposing a visit to the user is stored. As illustrated in FIG. 4, in the present embodiment, when the destination category is a camp place, the corresponding category is two types: a supermarket and a home improvement store. In this case, the rank corresponding to the supermarket is set to "1", and the rank corresponding to the home improvement store is set to "2". That is, in a case where the user of the vehicle 10 visits the camp place, the supermarket is set to preferentially propose the visit as compared with the home improvement store.

The control unit 201 refers to the facility information held in the facility information DB 203, and searches for one or a plurality of facilities (hereinafter, sometimes referred to as "candidate facilities") that are candidates for proposing a visit to the vehicle 10. Specifically, the control unit 201 searches for a facility that exists within a predetermined range from the scheduled traveling route of the vehicle 10 and belongs to a corresponding category as a candidate facility. Here, the predetermined range is a range determined by a distance suitable for the vehicle 10 to visit the facility. The predetermined range is, for example, a range in which a difference between a case in which the vehicle 10 does not visit a facility and a case in which the vehicle 10 visits the facility is equal to or less than a threshold value in the middle of the scheduled traveling route of the vehicle. Further, the predetermined range is a range in which the facility can be moved back and forth from the destination of the vehicle 10 at a predetermined travel distance or travel time.

At this time, since the searched candidate facility is a facility of a corresponding category existing within a predetermined range from the scheduled traveling route of the vehicle 10, the attribute suitable for the visit of the user is not considered. Therefore, the control unit 201 refers to the attribute field in the correspondence information held in the correspondence information DB 204 and acquires the priority attribute to determine the attribute of the facility to be used as the parameter for determining the proposed facility.

The control unit 201 also refers to the location field, size field, popularity field, pricing field, and congestion field in the facility information held in the facility information DB 203 to acquire the attributes of the candidate facility. Then, the control unit 201 determines one or a plurality of proposed facilities for proposing a visit to the vehicle 10 from the plurality of candidate facilities according to the attribute of each candidate facility and the priority attribute of each corresponding category. In addition, when a plurality of proposed facilities is determined at that time, the control unit 201 determines a priority order for proposing visits to the plurality of proposed facilities to the user of the vehicle 10.

Specifically, when the priority attribute is a location, the control unit 201 determines a higher priority in order of the location of the facility closer to the destination. In addition, when the priority attribute is the size of the facility, the control unit 201 determines a higher priority order in descending order of the size. When the priority attribute is a price of a commodity or a service, the control unit 201 determines a higher priority in descending order of the price of the commodity or the service. When the priority attribute is the popularity, the control unit 201 determines the priority in descending order of the popularity. When the priority attribute is the congestion level, the control unit 201 determines the priority level to be higher in descending order of the congestion level.

Here, the control unit 201 refers to the congestion level of the day of the week and the time zone expected to be visited by the user of the vehicle 10, and determines the priority level. The day of the week and the time zone expected to be visited by the user of the vehicle 10 are specified by calculating, for example, a time when the vehicle 10 travels straight to the candidate facility or a time when the vehicle 10 travels to the candidate facility after a predetermined time has elapsed since arriving at the destination. The predetermined time period is a time period in which the user of the vehicle 10 is assumed to temporarily stay at the destination. As the predetermined time, a predetermined time may be set according to the destination category.

In addition, there may be a plurality of corresponding categories. In this case, in order to determine the priorities of the entire candidate facilities belonging to a plurality of corresponding categories, the control unit 201 first determines the priorities of the candidate facilities for each corresponding category. Further, the control unit 201 refers to the order field in the correspondence information held in the correspondence information DB 204, and acquires the priorities of the correspondence categories. Then, the control unit 201 determines the priorities of the entire candidate facilities belonging to the plurality of corresponding categories according to the priorities of the acquired corresponding categories.

Specifically, the control unit 201 determines the priority of the entire candidate facility so that the higher the priority of the corresponding category, the higher the priority of the entire candidate facility. In addition, if the priorities of the corresponding categories are the same, the control unit 201 determines the priorities of the candidate facilities as a whole so that the higher the priority of the candidate facilities for each corresponding category (the priority determined from the attributes of the facilities), the higher the priority of the candidate facilities as a whole.

The control unit 201 causes the communication unit 202 to transmit, to the user terminal 100, proposal information including information about the determined one or more proposed facilities and their priorities. Here, the information on the proposed facilities is information including a location, a name, and a category of the proposed facilities. Upon receiving the proposal information, the user terminal 100 superimposes information indicating the locations, names, and categories of the proposed facilities on the map displayed on the display of the user terminal 100. At this time, for example, the user terminal 100 displays information indicating the locations, names, and categories of the proposed facilities on the map in descending order of priority. In this way, the user terminal 100 displays the proposal information according to the priority.

Here, if all of the candidate facilities are determined as the proposed facilities, all of the candidate facilities are superimposed on the map displayed on the user terminal 100. At this time, depending on the number of candidate facilities, the map displayed on the user terminal 100 may be difficult to see. Therefore, the control unit 201 determines a predetermined number of candidate facilities as the proposed facilities. The predetermined number is a number in which it is assumed that the map displayed on the user terminal 100 is not difficult to see even if the information about the proposed facilities is displayed in a superimposed manner on the map displayed on the user terminal 100.

In the present embodiment, the control unit 201 determines a priority order for proposing visits to a plurality of proposed facilities to the user of the vehicle 10. However, the control unit 201 does not necessarily have to determine the priority.

In this case, when the priority attribute is a location, the control unit 201 determines a predetermined number of candidate facilities as the proposed facilities in order of the location of the facility being closer to the destination. When the priority attribute is the size of the facility, the control unit 201 determines a predetermined number of candidate facilities in descending order of size as the proposed facilities. When the priority attribute is the price of the commodity or the service, the control unit 201 determines a predetermined number of candidate facilities as the proposed facilities in descending order of the price of the commodity or the service. When the priority attribute is the popularity, the control unit 201 determines a predetermined number of candidate facilities as the proposed facilities in descending order of popularity. When the priority attribute is the congestion degree, the control unit 201 determines a predetermined number of candidate facilities as the proposed facilities in descending order of the congestion degree. The predetermined number may be set to a different number for each corresponding category.

Flowchart

Figure 5:
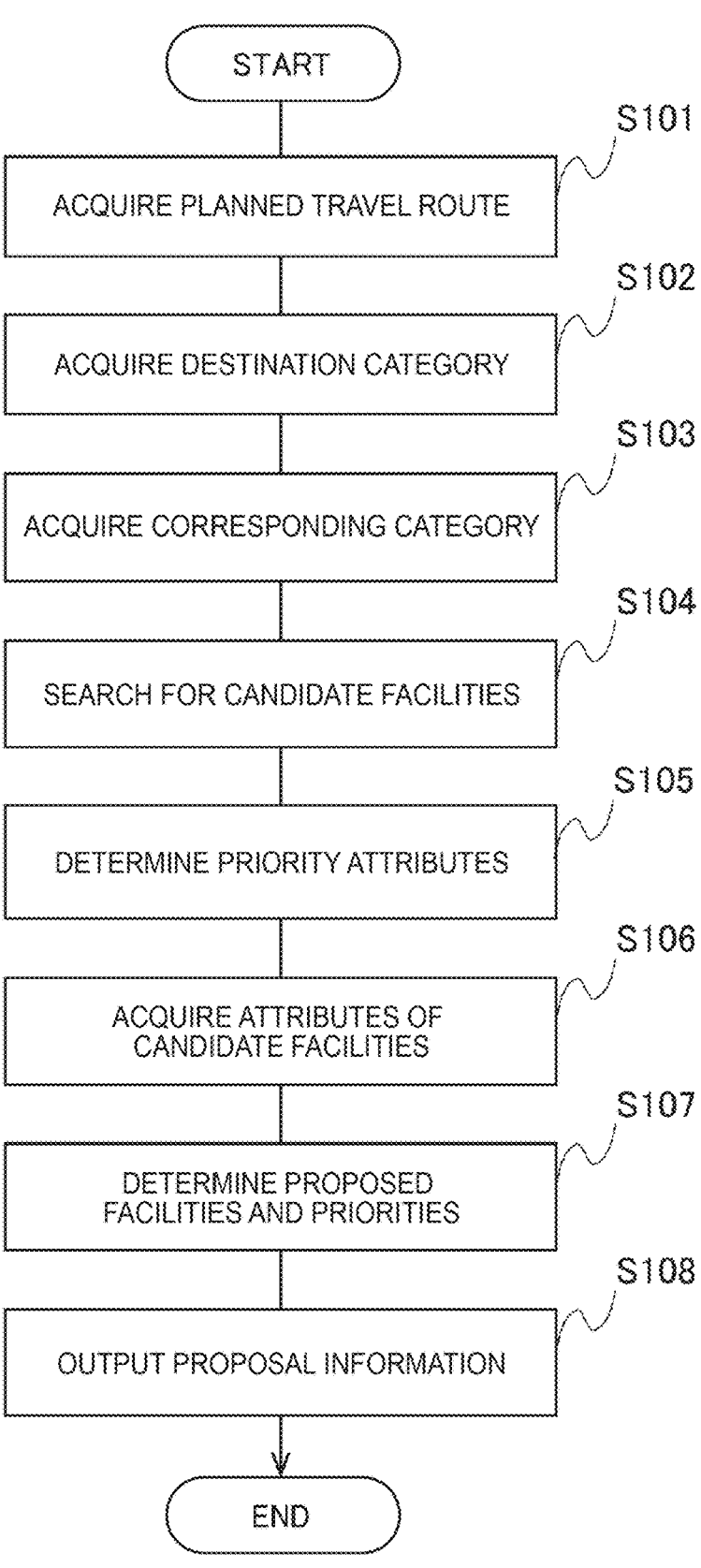
FIG. 5 is a flowchart of information processing executed by a control unit of the server.

Next, information processing executed by the control unit 201 in the server 200 in the proposal system 1 will be described with reference to FIG. 5. FIG. 5 is a flowchart of information processing executed by the control unit 201. The information processing illustrated in FIG. 5 is processing for outputting proposal information. Execution of the information processing illustrated in FIG. 5 is started when the server 200 receives the destination information from the user terminal 100 and generates the travel scheduled route.

In the process illustrated in FIG. 5, first, the generated travel scheduled route is acquired in S101. Next, in S102, from the facility information maintained in the facility information DB 203, the category (destination category) of the destination facility of the vehicle 10, which is the end point of the planned driving path, is acquired. Next, in S103, a category (corresponding category) related to the destination category is acquired from the correspondence information held in the correspondence information DB 204. Next, in S104, the facility information is referred to, and a facility that exists within a predetermined range from the scheduled traveling route of the vehicle 10 and belongs to the corresponding category is searched (specified) as a candidate facility.

Next, in S105, attribute fields in the correspondence information held in the correspondence information DB 204 are referred to, and priorities for the respective corresponding categories are determined. Next, in S106, the attributes of the respective candidate facilities are acquired from the facility information held in the facility information DB 203. Next, in S107, the proposed facility is determined from the candidate facility according to the attribute of each candidate facility and the prioritized attribute for each corresponding category. When a plurality of proposed facilities is determined, priorities for proposing a plurality of proposed facilities to the user of the vehicle 10 are determined in S107. Next, in S108, proposal information including information about the determined one or more proposed facilities is transmitted to the user terminal 100. When a plurality of proposed facilities is determined, proposal data including priorities thereof is transmitted to the user terminal 100 in S108. Then, the information processing illustrated in FIG. 5 is ended.

As explained above, in the proposal system 1, the facilities of the corresponding category related to the category of the destination facility of the vehicle 10 are searched as a candidate facility. Then, according to the attribute of the facility, one or a plurality of proposed facilities is determined from the one or a plurality of candidate facilities retrieved. Thus, the user of the vehicle 10 can grasp one or a plurality of proposed facilities belonging to the category related to the destination facility. Further, when a plurality of proposed facilities is determined, a priority order when proposing a plurality of proposed facilities to a user of the vehicle 10 is determined. As a result, it is possible to grasp a facility that can respond to the demand of the user of the vehicle 10 among the plurality of proposed facilities belonging to the category related to the destination facility. In this way, a visit to a facility suitable for the user of the vehicle 10 can be proposed.

Modified Examples

In the present embodiment, the user terminal 100 is a device mounted on the vehicle 10. However, the user terminal 100 does not necessarily have to be a device mounted on the vehicle 10. The user terminal 100 may be, for example, a personal digital assistant or a computer used by the user. In this case, the user does not necessarily have to move in the vehicle 10. Even in this way, it is possible to propose a visit to a facility suitable for the user.

Other Embodiments

The above-described embodiments are mere examples, and the present disclosure can be implemented with appropriate modifications within a range not departing from the scope thereof. Moreover, the processes and units described in the present disclosure can be freely combined and implemented unless technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium includes any type of media suitable for storing electronic instructions, such as, for example, any type of disk such as a magnetic disk (a floppy (registered trademark) disk, or a hard disk drive (HDD)), an optical disc (such as a CD-ROM, a DVD disc, and a Blu-ray disc), a read only memory (ROM), a random access memory (RAM), an EPROM, an EEPROM, a magnetic card, a flash memory, or an optical card.

What is claimed is:

1. An information processing device comprising a processor configured to:

receive first information on a first facility as a destination of a user from a user terminal;

generate a traveling route of a vehicle in accordance with the first information;

acquire a first category to which the first facility belongs, in accordance with the first information;

acquire a second category and a third category corresponding to the first category;

acquire a rank preset for the second category;

acquire a rank preset for the third category;

acquire, from a corresponding information database, an attribute corresponding to the second category;

acquire, from the corresponding information database, an attribute corresponding to the third category;

search for a plurality of second facilities that belong to the second category, the second facilities being located within a predetermined range from the traveling route;

search for a plurality of third facilities that belong to the third category, the third facilities being located within the predetermined range from the traveling route;

determine a priority order as to whether to preferentially propose to the user to visit the second facilities or to visit the third facilities based on the rank preset for the second category, the rank preset for the third category, the attribute associated with the second category, and the attribute corresponding to the third category;

determine, from the second facilities and the third facilities, one or more facilities to be proposed to the user to visit, according to the determined priority order; and output, to the user terminal, second information on a visit of the user to the determined one or more facilities, wherein the processor is further configured to set the priority order higher for a supermarket closer to the first facility among a plurality of supermarkets that the processor searches for as the second facilities in a case where the first category is a camp place, the second category is a supermarket, the third category is a home improvement store, the attribute corresponding to the second category is a location, and the rank preset for the second category is higher than the rank preset for the third category.

2. The information processing device according to claim 1, wherein the attribute corresponding to the second category includes a size of each of the second facilities.

3. The information processing device according to claim 1, wherein the attribute corresponding to the second category includes a price of a product or service provided at each of the second facilities.

4. The information processing device according to claim 1, wherein the processor is further configured to:

determine an attribute as a parameter that the processor determines the one or more facilities to be proposed to the user to visit according to at least one of the second category and the third category; and determine the one or more facilities to be proposed to the user to visit from the second facilities and third facilities according to the determined attribute.

5. The information processing device according to claim 1, wherein the attribute corresponding to the third category includes a size of each of the third facilities.

6. The information processing device according to claim 1, wherein the attribute corresponding to the third category includes a price of a product or service provided at each of the third facilities.

7. The information processing device according to claim 1, wherein the attribute corresponding to the second category includes a popularity level of the second facilities.

8. The information processing device according to claim 1, wherein the attribute corresponding to the third category includes a popularity level of the third facilities.

9. The information processing device according to claim 7, wherein the popularity level of the second facilities is determined according to a questionnaire result of a plurality of users using the second facilities.

10. The information processing device according to claim 8, wherein the popularity level of the third facilities is determined according to a questionnaire result of a plurality of users using the third facilities.

* * * * *